United States Patent
Watanabe

(10) Patent No.: US 8,670,927 B2
(45) Date of Patent: Mar. 11, 2014

(54) POSITIONING METHOD, PROGRAM, POSITIONING DEVICE, AND ELECTRONIC APPARATUS

(75) Inventor: Ken Watanabe, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 1267 days.

(21) Appl. No.: 12/241,725

(22) Filed: Sep. 30, 2008

(65) Prior Publication Data

US 2009/0099773 A1 Apr. 16, 2009

(30) Foreign Application Priority Data

Oct. 15, 2007 (JP) ................................. 2007-267485

(51) Int. Cl.
*G01C 21/00* (2006.01)
*G01S 19/42* (2010.01)

(52) U.S. Cl.
USPC ..................................... 701/412; 342/357.25

(58) Field of Classification Search
USPC ............. 701/124, 412; 342/357.25, 352, 353, 342/357.2, 51, 357.64, 357.72, 357.73
See application file for complete search history.

(56) References Cited

U.S. PATENT DOCUMENTS

| | | | |
|---|---|---|---|
| 6,317,077 B1* | 11/2001 | Soleimani et al. | 342/357.77 |
| 7,409,290 B2* | 8/2008 | Lin | 701/214 |
| 2007/0017106 A1* | 1/2007 | Ekseth et al. | 33/304 |

FOREIGN PATENT DOCUMENTS

| | | |
|---|---|---|
| JP | 2001-337156 A | 12/2001 |
| JP | 2005-024535 A | 1/2005 |
| JP | 2007-225459 A | 9/2007 |

* cited by examiner

*Primary Examiner* — Muhammad Shafi
(74) *Attorney, Agent, or Firm* — Global IP Counselors, LLP

(57) ABSTRACT

A positioning method in a positioning device includes: measuring a current position by receiving positioning signals transmitted from a plurality of positioning satellites and performing first positioning processing using a least square method; determining whether or not a result of the first positioning processing satisfies a positioning change condition set beforehand as a condition for change of positioning processing; and measuring the current position by receiving the positioning signals transmitted from the plurality of positioning satellites and performing second positioning processing using a Kalman filter after stopping the first positioning processing when it is determined that the result of the first positioning processing satisfies the positioning change condition.

15 Claims, 9 Drawing Sheets

| TIME | MEASURED POSITION | σ VALUE | | | |
|---|---|---|---|---|---|
| | | POSITION σ VALUE [m] | CLOCK BIAS σ VALUE [m] | VELOCITY σ VALUE [m/s] | CLOCK DRIFT σ VALUE [m/s] |
| t1 | (X1,Y1,Z1) | Pσ1 | Bσ1 | Vσ1 | Dσ1 |
| t2 | (X2,Y2,Z2) | Pσ2 | Bσ2 | Vσ2 | Dσ2 |
| t3 | (X3,Y3,Z3) | Pσ3 | Bσ3 | Vσ3 | Dσ3 |
| ... | ... | ... | ... | ... | ... |

FIG. 8

POSITIONING METHOD, PROGRAM, POSITIONING DEVICE, AND ELECTRONIC APPARATUS

BACKGROUND

1. Technical Field

The present invention relates to a positioning method, a program, a positioning device, and an electronic apparatus.

2. Related Art

A GPS (global positioning system) is widely known as a positioning system using a satellite and is used in a positioning device built in a mobile phone, a car navigation apparatus, and the like. The GPS measures its current position by executing a positioning operation for calculating four parameter values of three-dimensional coordinate values, which indicate the position of the GPS, and a time error on the basis of information, such as the positions of a plurality of GPS satellites or a pseudo distance from each GPS satellite to the GPS.

However, in the positioning using a GPS, it is difficult to avoid generation of a positioning error because there are various kinds of error factors, such as multipath influence. For this reason, various techniques for reducing the positioning error have been proposed. As an example, a technique related to positioning processing using a Kalman filter is disclosed in JP-A-2001-337156.

In positioning processing using the Kalman filter, positioning is performed by repeating a procedure of measuring the current position by predicting a relative movement distance from a measured position before 1 time, but it is necessary to set an initial position first. In the technique disclosed in JP-A-2001-337156, for example, a measured position obtained in positioning processing using a least square method is set as the initial position.

However, in the case where the measured position obtained in the positioning processing using the least square method largely deviates from the true position of the positioning device, there has been a problem that the positioning accuracy lowers in the positioning processing using the Kalman filter because the measured position is calculated by predicting the relative movement distance from the largely deviating position.

SUMMARY

The invention has been finalized in view of the above-described problems.

In order to solve the above problems, according to a first aspect of the invention, a positioning method in a positioning device includes: measuring a current position by receiving positioning signals transmitted from a plurality of positioning satellites and performing first positioning processing using a least square method; determining whether or not a result of the first positioning processing satisfies a positioning change condition set beforehand as a condition for change of positioning processing; and measuring the current position by receiving the positioning signals transmitted from the plurality of positioning satellites and performing second positioning processing using a Kalman filter after stopping the first positioning processing when it is determined that the result of the first positioning processing satisfies the positioning change condition.

Furthermore, according to a second aspect of the invention, a positioning device includes: a first positioning processing section that measures a current position by receiving positioning signals transmitted from a plurality of positioning satellites and performing first positioning processing using a least square method; a positioning change condition determining section that determines whether or not a result of the first positioning processing satisfies a positioning change condition set beforehand as a condition for change of positioning processing; and a second positioning processing section that measures the current position by receiving the positioning signals transmitted from the plurality of positioning satellites and performing second positioning processing using a Kalman filter after stopping the first positioning processing when it is determined that the result of the first positioning processing satisfies the positioning change condition.

According to the first aspect and the like of the invention, the current position is measured by receiving positioning signals transmitted from a plurality of GPS satellites and then performing the first positioning processing using the least square method. Then, it is determined whether or not a result of the first positioning processing satisfies a positioning change condition set beforehand as a condition for change of positioning processing. If it is determined that the result of the first positioning processing satisfies the positioning change condition, the first positioning processing is stopped and GPS satellite signals transmitted from the plurality of GPS satellites are received and then second positioning processing using a Kalman filter is performed, thereby measuring the current position.

By determining that the positioning change condition is satisfied at a point of time when a highly reliable measured position is obtained in the first positioning processing and then changing to the second positioning processing, a measured position with low reliability is not used in the second positioning processing. As a result, it is prevented that the positioning accuracy lowers.

Furthermore, according to a third aspect of the invention, in the positioning method according to the first aspect of the invention, in the determination on whether or not the positioning change condition is satisfied, it is determined that the positioning change condition is satisfied when the number of times of consecutive measurements of the current position in the first positioning processing reaches a predetermined number of times of positioning change.

Furthermore, according to a fourth aspect of the invention, in the positioning device according to the second aspect of the invention, in the determination on whether or not the positioning change condition is satisfied, the positioning change condition determining section may determine that the positioning change condition is satisfied when the number of times of consecutive measurements of the current position in the first positioning processing reaches a predetermined number of times of positioning change.

According to the third aspect and the like of the invention, it is determined that the positioning change condition is satisfied when the number of times of consecutive measurements of the current position in the first positioning processing reaches the predetermined number of times of positioning change. By repeatedly executing the first positioning processing a predetermined number of times, a possibility that a highly reliable measured position will be obtained is increased.

Furthermore, according to a fifth aspect of the invention, in the positioning method according to the first or third aspect of the invention, the first positioning processing is processing for calculating errors of positional information and velocity information on the positioning device in addition to measuring the current position. In addition, in the determination on whether or not the positioning change condition is satisfied, it is determined that the positioning change condition is satisfied when an error calculated this time and an error calculated last time in the first positioning processing satisfy a predetermined error equality condition.

Furthermore, according to a sixth aspect of the invention, in the positioning device according to the second or fourth aspect of the invention, the first positioning processing section may calculate errors of positional information and velocity information in addition to measuring the current position in the first positioning processing. In addition, in the determination on whether or not the positioning change condition is satisfied, the positioning change condition determining section may determine that the positioning change condition is satisfied when an error calculated this time and an error calculated last time in the first positioning processing satisfy a predetermined error equality condition.

According to the fifth aspect and the like of the invention, the errors of the positional information and velocity information on the positioning device are calculated in the first positioning processing, and it is determined that the positioning change condition is satisfied when the error calculated this time and the error calculated last time satisfy a predetermined error equality condition. If the errors of positional information and velocity information are equal in current positioning and last positioning, there is a high possibility that a current measured position will be highly reliable.

Furthermore, according to a seventh aspect of the invention, in the positioning method according to the fifth aspect of the invention, the second positioning processing is processing for calculating a covariance of the errors of the positional information and velocity information on the positioning device in addition to measuring the current position. In addition, the positioning method further includes setting an initial value of the covariance of the errors on the basis of the errors calculated in the first positioning processing.

Furthermore, according to an eighth aspect of the invention, in the positioning device according to the sixth aspect of the invention, the second positioning processing section may calculate a covariance of the errors of the positional information and the velocity information in addition to measuring the current position in the second positioning processing, and an error covariance initial value setting section that sets an initial value of the covariance of the errors on the basis of the errors calculated in the first positioning processing may be further included.

According to the seventh aspect and the like of the invention, the covariance of the errors of the positional information and velocity information on the positioning device is calculated in the second positioning processing, while the initial value of the covariance of the errors is set on the basis of the errors calculated in the first positioning processing. Thus, since the initial value of the covariance of errors suitable for the actual environment is set, the positioning accuracy of the second positioning processing is improved.

Furthermore, according to a ninth aspect of the invention, the positioning method according to the seventh aspect of the invention may further include: determining whether or not the covariance of the errors calculated in the second positioning processing satisfies a predetermined low error condition; and stopping the second positioning processing and performing the first positioning processing when it is determined that the low error condition is not satisfied.

Furthermore, according to a tenth aspect of the invention, the positioning device according to the eighth aspect of the invention may further include a low error condition determining section that determines whether or not the covariance of the errors calculated in the second positioning processing satisfies a predetermined low error condition. In addition, the first positioning processing section may stop the second positioning processing and perform the first positioning processing when it is determined that the low error condition is not satisfied.

According to the ninth aspect and the like of the invention, it is determined whether or not the covariance of the errors calculated in the second positioning processing satisfies the predetermined low error condition, and second positioning processing is stopped and the first positioning processing is performed when the covariance of the errors calculated in the second positioning processing is determined not to satisfy the predetermined low error condition. Therefore, a change to the first positioning processing is made at a point of time when a measured position with low accuracy is obtained in the second positioning processing.

Furthermore, according to an eleventh aspect of the invention, the positioning method according to any one of the first, third, fifth, seventh, and ninth aspects of the invention may further include: determining whether or not an elapsed time after the second positioning processing is performed last has reached a predetermined positioning change time; and stopping the second positioning processing and performing the first positioning processing when it is determined that the elapsed time has reached the positioning change time.

Furthermore, according to a twelfth aspect of the invention, the positioning device according to any one of the second, fourth, sixth, eighth, and tenth aspects of the invention may further include a positioning change time determining section that determines whether or not an elapsed time after the second positioning processing is performed last has reached a predetermined positioning change time. In addition, the first positioning processing section may stop the second positioning processing and perform the first positioning processing when it is determined that the elapsed time has reached the positioning change time.

According to the eleventh aspect and the like of the invention, it is determined whether or not the elapsed time after the second positioning processing is performed last has reached the predetermined positioning change time, and second positioning processing is stopped and the first positioning processing is performed when the elapsed time after the second positioning processing is performed last is determined to have reached the predetermined positioning change time. Therefore, a change to the first positioning processing is made when the second positioning processing is not performed for a predetermined period of time.

Furthermore, according to a thirteenth aspect of the invention, the positioning method according to any one of the first, third, fifth, seventh, ninth, and eleventh aspects of the invention may further include performing the second positioning processing by changing a filter characteristic of the Kalman filter such that a variation in measured position according to a time change becomes large until a predetermined stability condition is satisfied after the positioning processing has changed from the first positioning processing to the second positioning processing.

According to the thirteenth aspect of the invention, the filter characteristic of the Kalman filter is changed such that a variation in measured position according to a time change becomes large until a predetermined stability condition is satisfied after the positioning processing has changed from the first positioning processing to the second positioning processing. Since the accuracy of the measured position obtained in the first positioning processing may be low, the variation in measured position according to a time change is made large for a while after a change to the second positioning processing is made, such that the measured position becomes easily close to the true position.

Furthermore, according to a fourteenth aspect of the invention, there is provided a program causing a computer provided in a positioning device to execute the positioning method according to anyone of the first, third, fifth, seventh, ninth, eleventh, and thirteenth aspects of the invention. In addition, according to a fifteenth aspect of the invention, there is provided an electronic apparatus including the positioning device according to any one of the second, fourth, sixth, eighth, tenth, and twelfth aspects of the invention.

BRIEF DESCRIPTION OF THE DRAWINGS

The invention will be described with reference to the accompanying drawings, wherein like numbers reference like elements.

FIG. 8 is a view illustrating an example of the data configuration of positioning history data.

DESCRIPTION OF EXEMPLARY EMBODIMENTS

Figure 1:
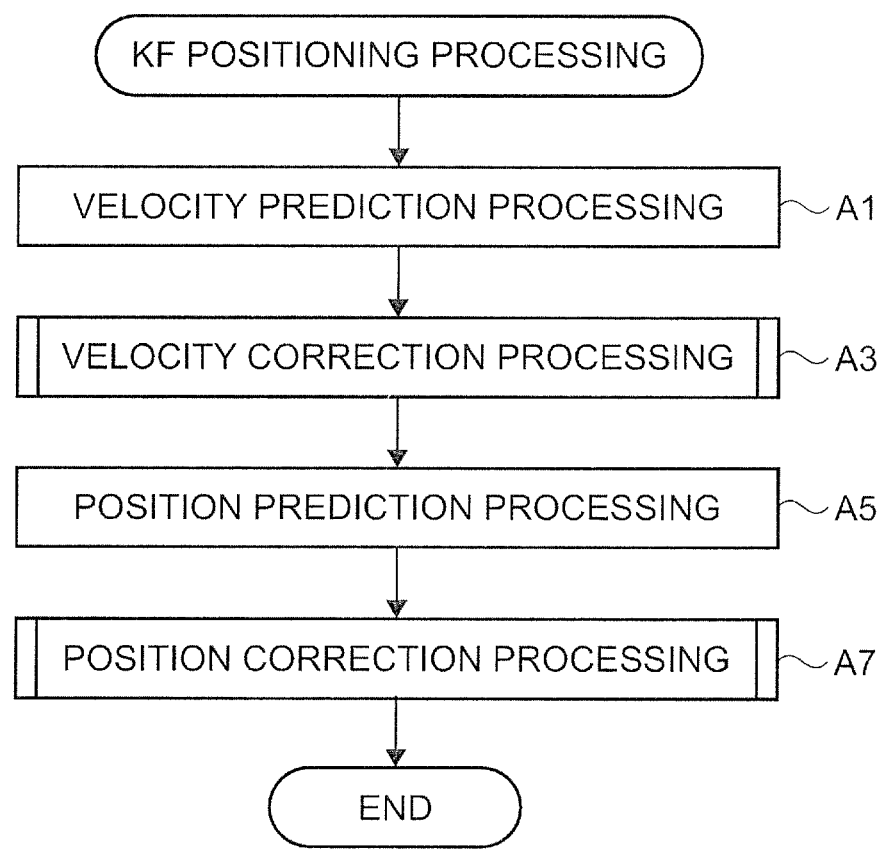
FIG. 1 is a flow chart illustrating the flow of KF positioning processing.

Hereinafter, a preferred embodiment of the invention will be described with reference to the accompanying drawings. In addition, a case where a mobile phone is mentioned as an example of an electronic apparatus including a positioning device and a GPS is used as a positioning system will be described below. However, an embodiment to which the invention can be applied is not limited to the above case.

1. Principles

A mobile phone 1 receives a GPS satellite signal as a positioning signal transmitted (emitted) from a GPS satellite which is a positioning satellite and calculates satellite information, such as the position, movement direction, and velocity of the GPS satellite, on the basis of a navigation message, such as orbital information (ephemeris data and almanac data) on the GPS satellite superimposed on the received GPS satellite signal. The GPS satellite signal is a signal, which is obtained by spread spectrum modulation and is called a C/A (coarse and acquisition) code, and is superimposed on a carrier which has a carrier frequency of 1.57542 [GHz] and is in a band of L1.

In addition, four GPS satellites are disposed on each of six orbital surfaces and are operated, in principle, such that four or more satellites can always be observed under geometric arrangement from anywhere on the earth. In the following description, a GPS satellite that has transmitted a captured GPS satellite signal is referred to as a 'captured satellite' in order to distinguish the GPS satellite from other GPS satellites.

In addition, the mobile phone 1 calculates an electric wave propagation time from the captured satellite to the mobile phone 1 on the basis of a difference between a time when a GPS satellite signal specified by a built-in crystal clock has been received and a time when the GPS satellite has transmitted the received GPS satellite signal. In addition, the distance (pseudo distance) from the captured satellite to the mobile phone 1 is calculated by multiplying the calculated electric wave propagation time by the speed of light.

The mobile phone 1 measures its current position by executing a positioning operation for calculating four parameter values of three-dimensional coordinate values, which indicate the position of the mobile phone 1, and a time error on the basis of satellite information on a plurality of captured satellites or information on a distance (pseudo distance) from each captured satellite to the mobile phone 1, for example.

In the present embodiment, the mobile phone 1 measures its current position by performing switching between positioning processing (hereinafter, referred to as 'LS (least square) positioning processing') using a least square method and positioning processing (hereinafter, referred to as 'KF (Kalman filter) positioning processing') using a Kalman filter. Since the LS positioning processing is well-known processing, an explanation thereof will be omitted. Here, the KF positioning processing in the present embodiment will be described in detail.

The Kalman filter uses an estimation method based on the probability theory of estimating a state amount changing with time by using an observed value including a measurement error. In the present embodiment, a state of the mobile phone 1 is expressed as a state vector 'X', and the covariance of an error between the state vector 'X' and a true value is expressed as an error covariance matrix 'P'.

The state vector 'X' is an eight-dimensional vector having three-dimensional position vector (x, y, z), clock bias (b), three-dimensional velocity vector (u, v, w), and clock drift (d) of the mobile phone 1 as elements. In addition, the error covariance matrix 'P' is a matrix of 8×8 indicating the covariance of the error of each element of the state vector 'X'.

In the KF positioning processing, prediction and correction of the state vector 'X' and error covariance matrix 'P' are performed. In the following description, a unit indicating a temporal change (predetermined time interval in calculation processing) in the calculation processing is referred to as '1 time', and the current position of the mobile phone 1 is measured for each time while progressing the time one by one.

FIG. 1 is a flow chart illustrating the flow of KF positioning processing in the present embodiment.

First, velocity prediction processing for predicting the velocity of the mobile phone 1 is performed (step A1). Specifically, predicted values of the current state vector 'X' and error covariance matrix 'P' are calculated according to expressions (1) and (2).

$$X_t^- = X_{t-1}^+ \quad (1)$$

$$P_t^- = \phi_t P_{t-1}^+ \phi_t^T + Q_{t-1} \quad (2)$$

Here, a suffix 't', added below in each expression denotes a time, a suffix '−' added above denotes a predicted value, a suffix '+' added above denotes a correction value, and a suffix 'T' added above denotes a transposed matrix. In addition, 'φ' is a matrix of 8×8 called a state transition matrix, and 'Q' is a matrix of 8×8 called a process noise. Lines of row and columns of the state transition matrix 'ϕ' and process noise 'Q' correspond to the eight-dimensional components (x, y, z, b, u, v, w, d) of the state vector 'X'.

In the present embodiment, calculation is performed by using the state transition matrix 'ϕ' expressed by the following expression (3).

$$\phi = \begin{bmatrix} 1 & 0 & 0 & 0 & dt & 0 & 0 & 0 \\ 0 & 1 & 0 & 0 & 0 & dt & 0 & 0 \\ 0 & 0 & 1 & 0 & 0 & 0 & dt & 0 \\ 0 & 0 & 0 & 1 & 0 & 0 & 0 & dt \\ 0 & 0 & 0 & 0 & 1 & 0 & 0 & 0 \\ 0 & 0 & 0 & 0 & 0 & 1 & 0 & 0 \\ 0 & 0 & 0 & 0 & 0 & 0 & 1 & 0 \\ 0 & 0 & 0 & 0 & 0 & 0 & 0 & 1 \end{bmatrix} \quad (3)$$

Here, 'dt' is a time difference between a time when last KF positioning processing was performed and a current time.

As can be seen from the expression (1), a correction value of the state vector 'X' before 1 time is set to a predicted value of the current state vector 'X' in the velocity prediction processing. That is, it is predicted whether or not the current velocity of the mobile phone 1 is the same as the velocity calculated before 1 time. After performing the velocity prediction processing, velocity correction processing for correcting the predicted velocity is performed (step A3).

Figure 2:
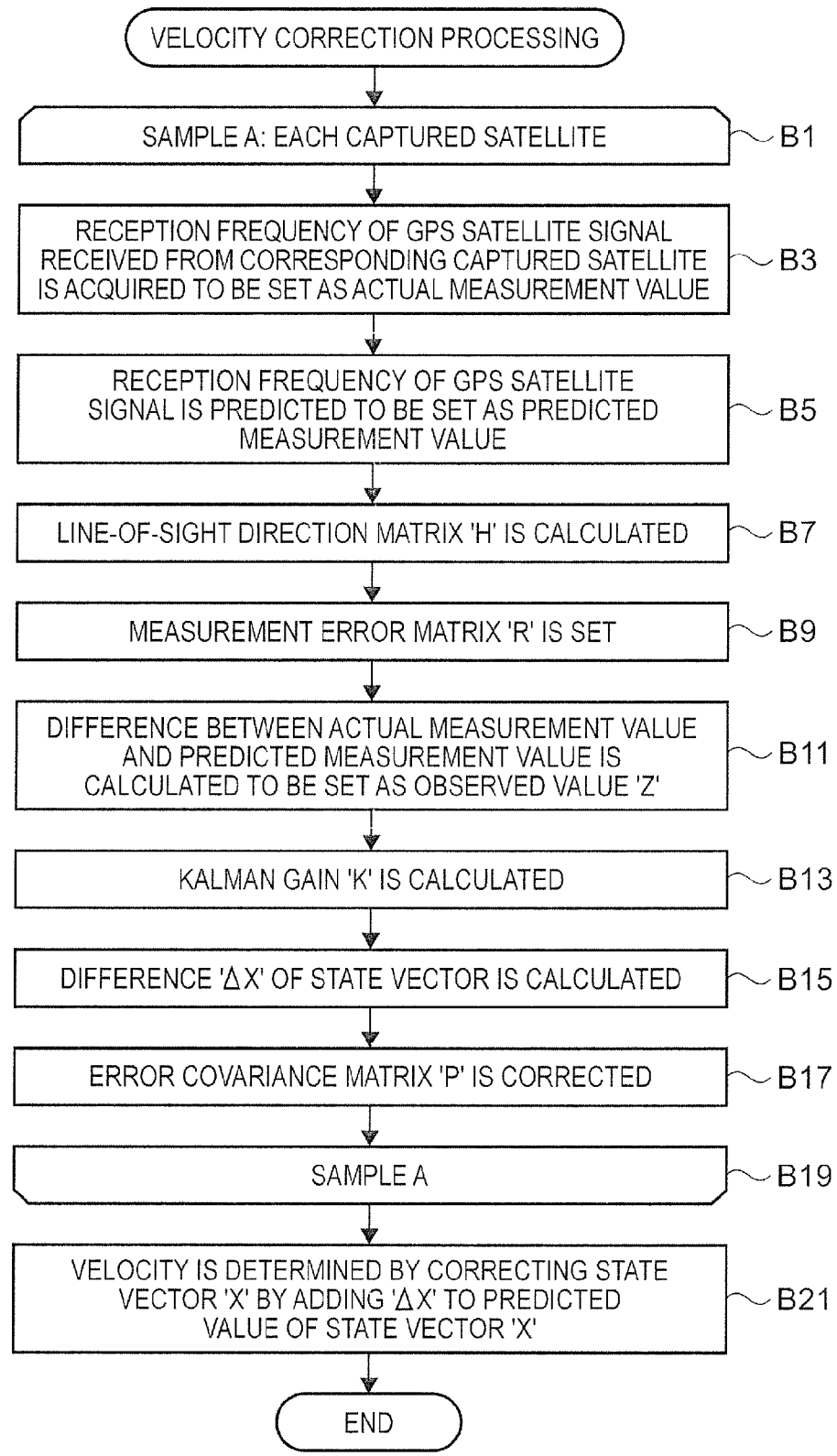
FIG. 2 is a flow chart illustrating the flow of velocity correction processing.

FIG. 2 is a flow chart illustrating the flow of velocity correction processing.

In the velocity correction processing, processing of a loop A is repeatedly executed for each captured satellite (steps B1 to B19). In the loop A, first, a reception frequency used to receive a GPS satellite signal from the captured satellite is acquired to be set as an actual measurement value regarding the reception frequency (hereinafter, an actual measurement value regarding the received GPS satellite signal is referred to as an 'actual measurement value') (step B3).

Although a frequency of the GPS satellite signal is specified as 1.57542 [GHz], the reception frequency in the mobile phone 1 changes according to changes in relative movement direction and movement velocity of the GPS satellite and the mobile phone 1. This frequency shift is a so-called Doppler frequency, and the reception frequency is a frequency after shift caused by the Doppler frequency.

In addition, a reception frequency of the GPS satellite signal is predicted on the basis of information (satellite information) on the position, movement direction, and velocity of the captured satellite and information (hereinafter, comprehensively referred to as 'own information') on the position, movement direction, and velocity of the mobile phone 1 obtained from the predicted value of the state vector 'X', being set as a predicted value regarding the reception frequency (hereinafter, a predicted value of an actual measurement value is referred to as a 'predicted measurement value') (step B5).

Then, a line-of-sight direction matrix 'H' indicating the line-of-sight direction from the mobile phone 1 to the corresponding captured satellite is calculated on the basis of the satellite information of the captured satellite and the own information (step B7). Then, a predetermined measurement error matrix 'R' is set as a matrix indicating a measurement error of the observed value 'Z' used as an input value of the Kalman filter (step B9). Then, a difference between the actual measurement value obtained in step B3 and the predicted measurement value calculated in step B5 regarding the reception frequency is calculated to be set as the observed value 'Z' of the captured satellite (step B11).

By using the difference between the actual measurement value and predicted value of the reception frequency of the GPS satellite signal as an input value of the Kalman filter, the variation of the three-dimensional velocity vector (u, v, w) and clock drift (d) of the state vector 'X' can be calculated. In this case, the variation of the three-dimensional position vector (x, y, z) and clock bias (b) of the state vector 'X' is '0'.

Then, a Kalman gain 'K' is calculated according to the following expression (4) using the predicted value of the error covariance matrix 'P' calculated in the velocity prediction processing, the line-of-sight direction matrix 'H' and the measurement error matrix 'R' (step B13).

$$K_t = P_t^- H_t^T (H_t P_t^- H_t^T + R_t)^{-1} \quad (4)$$

Then, a difference 'ΔX' of the state vector is calculated according to the following expression (5) using the Kalman gain 'K', the observed value 'Z', and the line-of-sight direction matrix 'H' (step B15).

$$\Delta X_t = \Delta X_t + K_t (Z_t - H_t \Delta X_t) \quad (5)$$

Then, the error covariance matrix 'P' is corrected according to the following expression (6) using the Kalman gain 'K', the line-of-sight direction matrix 'H', and the predicted value of the error covariance matrix 'P' (step B17).

$$P_t^+ = (I - K_t H_t) P_t^- \quad (6)$$

Here, 'I' is a unit matrix.

The difference 'ΔX' of the state vector and the error covariance matrix 'P' are updated while sequentially performing the processing in steps B3 to B17 for all captured satellites. Then, the velocity of the mobile phone 1 is determined by correcting the state vector 'X' by adding the difference 'ΔX' of the state vector to the predicted value of the state vector 'X' calculated in the velocity prediction processing according to the following expression (7) (step B21).

$$X_t^+ = X_t^- \Delta X_t \quad (7)$$

In the state vector 'X' obtained in step B21, the three-dimensional velocity vector (u, v, w) and the clock drift (d) are corrected from predicted values, respectively. This is done by calculating the difference 'ΔX' of the state vector using, as the observed value 'Z', the difference between the actual measurement value and predicted measurement value regarding the reception frequency of the GPS satellite signal, as described above. The velocity expressed by the three-dimensional velocity vector (u, v, w) of the state vector 'X' after correction is a velocity of current time.

Returning to the KF positioning processing of FIG. 1, velocity correction processing is performed and then position prediction processing for predicting the position of the mobile phone 1 is performed (step A5). Specifically, the predicted value of the state vector 'X' is calculated by multiplying the correction value of the state vector 'X' calculated in the velocity correction processing by the state transition matrix 'ϕ' according to the following expression (8)

$$X_t^- = \phi X_t^+ \quad (8)$$

As can be seen from the expression (3), diagonal elements of a matrix portion of 3×3 corresponding to the three-dimensional velocity vector (u, v, w) of the state transition matrix 'ϕ' are set as a time difference 'dt' between a last time and a current time. Therefore, in the case when the correction value of the state vector 'X' is multiplied by the state transition matrix 'ϕ', noting the position elements, a current predicted position of the mobile phone 1 is calculated by adding a predicted moving distance to the measured position before 1 time. After performing the position prediction processing, position correction processing for correcting the prediction position is performed (step A7).

Figure 3:
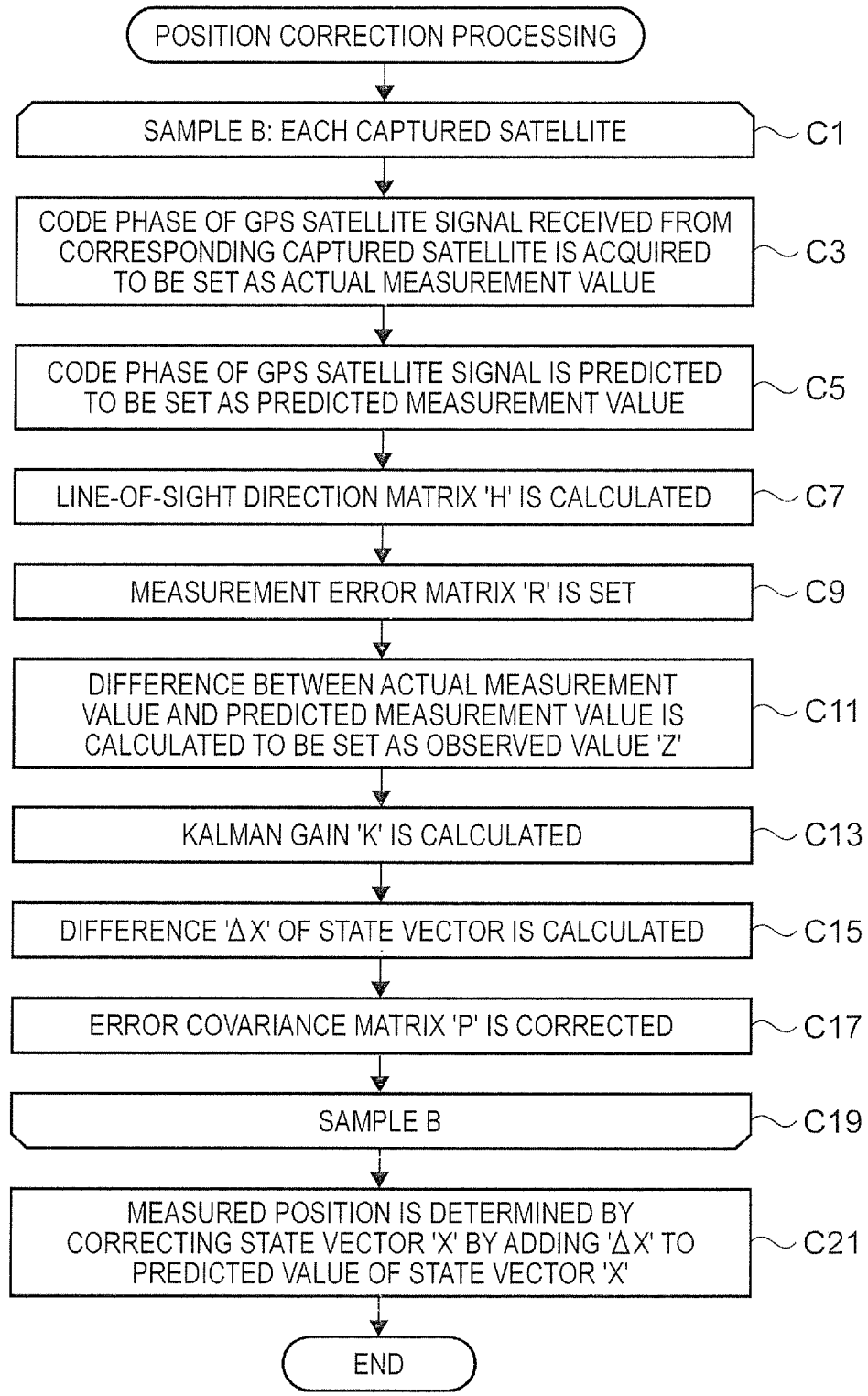
FIG. 3 is a flow chart illustrating the flow of position correction processing.

FIG. 3 is a flow chart illustrating the flow of position correction processing.

Since the flow of the position correction processing is almost the same as that of the velocity correction processing, the following explanation will be focused on different parts. In the position correction processing, a code phase of the GPS satellite signal received from the captured satellite is acquired to be set as an actual measurement value regarding a code phase (step C3), and a code phase of the GPS satellite signal is predicted to be set as the predicted measurement value regarding a code phase (step C5). Then, a difference between the actual measurement value and predicted measurement value regarding the code phase is calculated to be set as the observed value 'Z' which is an input value of the Kalman filter (step C11).

Here, the code phase is a phase of the C/A code modulated into the GPS satellite signal. Ideally, it may be regarded that C/A codes are continuously arrayed between the GPS satellite and the mobile phone 1. However, the distance from the GPS satellite to the mobile phone 1 does not necessarily be the integral multiple of the length of the C/A code. In this case, the length obtained by adding a fractional part to the integral multiple of the length of the C/A code becomes the distance between the GPS satellite and the mobile phone 1, and a phase equivalent to the fractional part is the code phase.

By setting the difference between the actual measurement value and predicted measurement value regarding the code phase of the GPS satellite signal as an input value of the Kalman filter, the variation of the three-dimensional position vector (x, y, z) and clock bias (b) of the state vector 'X' can be calculated. In this case, the variation of the three-dimensional velocity vector (u, v, w) and clock drift (d) is '0'.

The difference 'ΔX' of the state vector and the error covariance matrix 'P' are updated while sequentially performing the processing in steps C3 to C17 for all captured satellites. Then, the position of the mobile phone 1 is determined by correcting the state vector 'X' by adding the difference 'ΔX' of the state vector to the predicted value of the state vector 'X' calculated in the position prediction processing according to the following expression (7) (step C21).

In the state vector 'X' obtained in step C21, the three-dimensional position vector (x, y, z) and the clock bias (b) are corrected from predicted values, respectivelye. This is done by calculating the difference 'ΔX' of the state vector using, as the observed value 'Z', the difference between the actual measurement value and predicted value regarding the code phase of the GPS satellite signal, as described above. The position expressed by the three-dimensional position vector (x, y, z) of the state vector 'X' after correction is a measured position of current time that is finally calculated.

Next, a principle of performing switching between the LS positioning processing and the KF positioning processing will be described. In the present embodiment, in positioning processing, values indicating errors of position, clock bias, velocity, and clock drift of the mobile phone 1 (hereinafter, referred to as 'position σ value', 'clock bias σ value', 'velocity σ value', and 'clock drift σ value', respectively; collectively referred to as 'σ value') are calculated and the positioning processing is switched on the basis of the σ value.

A method of calculating the σ value will be described. When a small change 'δr' occurs in the line-of-sight direction matrix 'H' of the three-dimensional position vector (x, y, z) and the clock bias (b) of the mobile phone 1, the following relationship shown by expression (9) is satisfied among an influence 'δX' given to a vector (x, y, z, s) having a position and a clock bias as elements, the line-of-sight direction matrix 'H', and the change 'δr'.

$$H\delta X = \delta r \tag{9}$$

By calculating 'δX' from the expression (9) using an inverse matrix of the line-of-sight direction matrix 'H', the following expression (10) is obtained.

$$\delta X = H^{-1} \delta r \tag{10}$$

At this time, the following expression (11) is obtained by calculating a covariance matrix 'cov(δX)' of the 'δX' using a rule of error propagation.

$$\text{cov}(\delta X) = H^{-1} \text{cov}(\delta r)(H^{-1})^T \tag{11}$$

Here, if there is no correlation among elements of 'δr' and a variance of a measurement error is expressed as 'σ²', the following expression (12) is satisfied.

$$\text{cov}(\delta r) = \sigma^2 I \tag{12}$$

Therefore, the following expression (13) can be obtained by substituting the expression (12) into the expression (11).

$$\begin{aligned}
\text{cov}(\delta X) &= H^{-1} \sigma^2 I (H^{-1})^T \\
&= \sigma^2 (H^T H)^{-1} \\
&= \begin{bmatrix} \sigma_{xx}^2 & \sigma_{xy}^2 & \sigma_{xz}^2 & \sigma_{xs}^2 \\ \sigma_{yx}^2 & \sigma_{yy}^2 & \sigma_{yz}^2 & \sigma_{ys}^2 \\ \sigma_{zx}^2 & \sigma_{zy}^2 & \sigma_{zz}^2 & \sigma_{zs}^2 \\ \sigma_{sx}^2 & \sigma_{sy}^2 & \sigma_{sz}^2 & \sigma_{ss}^2 \end{bmatrix}
\end{aligned} \tag{13}$$

At this time, the position a value σ value '$\sigma_P$' and the clock bias σ value '$\sigma_B$' can be calculated according to the following expressions (14) and (15) using elements of the covariance matrix 'cov(δX)'.

$$\sigma_P = \sqrt{\sigma_{xx}^2 + \sigma_{yy}^2 + \sigma_{zz}^2} \tag{14}$$

$$\sigma_B = \sqrt{\sigma_{ss}^2} \tag{15}$$

The velocity σ value and the clock drift σ value may be calculated in the same manner. That is, when the covariance matrix 'cov(δX)' of the influence 'δX' that the small change 'δr' has on a vector (u, v, w, d) having a velocity and a clock drift as elements is calculated by performing the same calculation as described above using the line-of-sight direction matrix 'H' of the three-dimensional velocity vector (u, v, w) and the clock drift (d) of the mobile phone 1, the following expression (16) is obtained.

$$\begin{aligned}
\text{cov}(\delta X) &= H^{-1} \sigma^2 I (H^{-1})^T \\
&= \sigma^2 (H^T H)^{-1} \\
&= \begin{bmatrix} \sigma_{uu}^2 & \sigma_{uv}^2 & \sigma_{uw}^2 & \sigma_{ud}^2 \\ \sigma_{vu}^2 & \sigma_{vv}^2 & \sigma_{vw}^2 & \sigma_{vd}^2 \\ \sigma_{wu}^2 & \sigma_{wv}^2 & \sigma_{ww}^2 & \sigma_{wd}^2 \\ \sigma_{du}^2 & \sigma_{dv}^2 & \sigma_{dw}^2 & \sigma_{dd}^2 \end{bmatrix}
\end{aligned} \tag{16}$$

At this time, the velocity σ value '$\sigma_V$' and the clock drift σ value '$\sigma_D$' can be calculated according to the following expressions (17) and (18) using elements of the covariance matrix 'cov(δX)'.

$$\sigma_V = \sqrt{\sigma_{uu}^2 + \sigma_{vv}^2 + \sigma_{ww}^2} \quad (17)$$

$$\sigma_D = \sqrt{\sigma_{dd}^2} \quad (18)$$

In the present embodiment, when the number of times of consecutive measurements of the current position in the LS positioning processing reaches a predetermined number of times (for example, '20 times') and a σ value calculated this time and a σ value calculated last time in the LS positioning processing satisfy the error equality condition, the processing changes from the LS positioning processing to the KF positioning processing.

Specifically, for each of the position σ value, the clock bias σ value, the velocity σ value, and the clock drift σ value, a difference between a value calculated in current LS positioning processing and a value calculated in last LS positioning processing is calculated. Then, the calculated σ value difference is compared with a threshold value set beforehand for each of the four kinds of σ values. If all σ value differences do not exceed the threshold values (if there is no σ value difference exceeding the threshold value), it is determined that the error equality condition is satisfied.

If each error of the position, clock bias, velocity, and clock drift in last LS positioning processing is equal to that in current processing, there is a high possibility that the reliability of the measured position obtained in the current LS positioning processing will be high. Therefore, at a point of time when the error equality condition is satisfied after consecutively executing the LS positioning processing a predetermined number of times, a change to the KF positioning processing is performed.

After the change to the KF positioning processing, the KF positioning processing is continued while the error covariance matrix 'P' obtained in the KF positioning processing satisfies a predetermined low error condition. Specifically, it is determined that the low error condition is satisfied when each element of a 3×3 matrix portion, which corresponds to the three-dimensional position vector (x, y, z), of the error covariance matrix 'P' does not exceed the predetermined threshold value. On the other hand, when at least one element exceeding the threshold value exists, it is determined that the low error condition is not satisfied and then the processing changes to the LS positioning processing.

2. Functional Configuration

Figure 4:
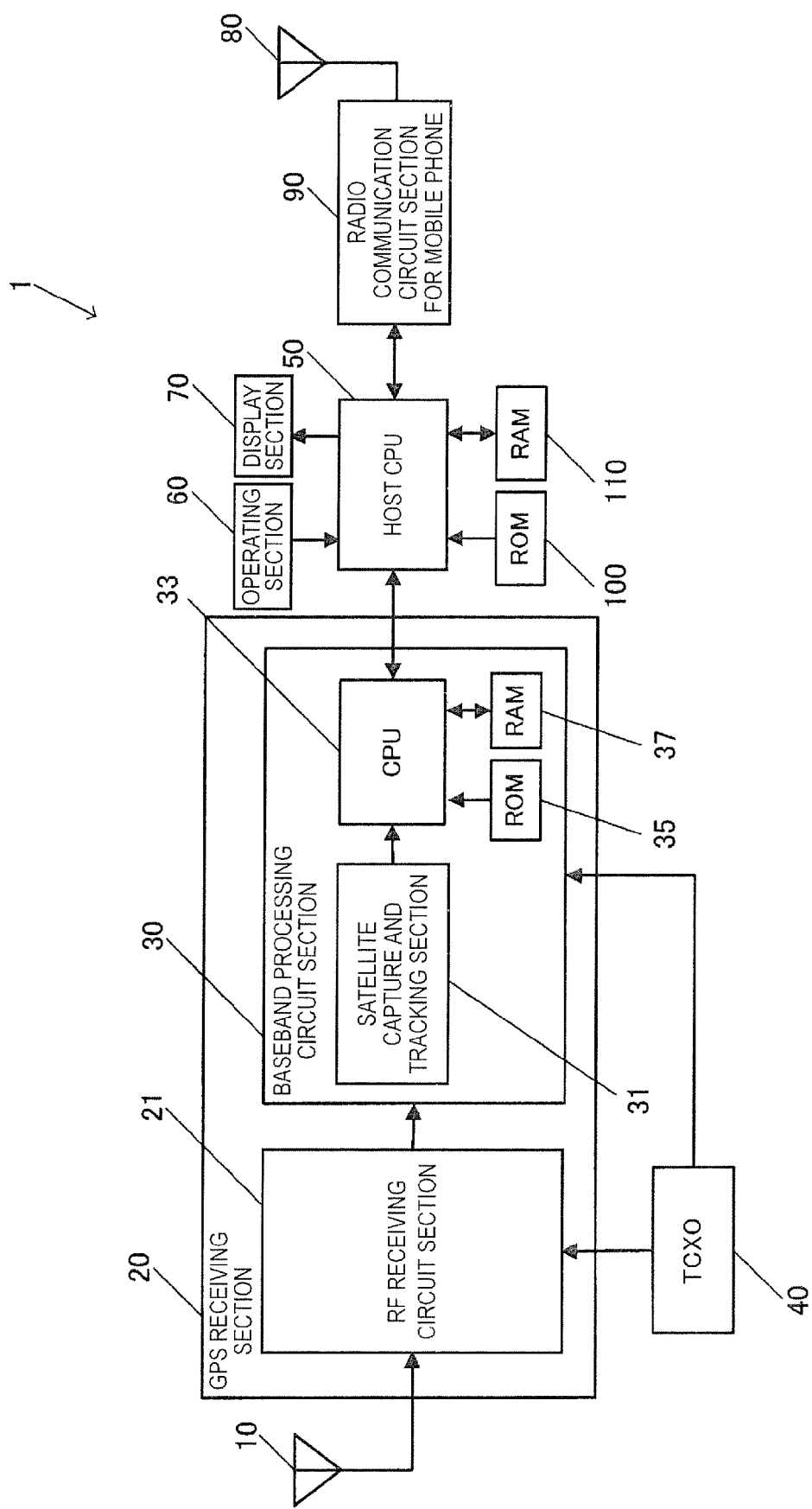
FIG. 4 is a block diagram illustrating the functional configuration of a mobile phone.

FIG. 4 is a block diagram illustrating the functional configuration of the mobile phone 1. The mobile phone 1 is configured to include a GPS antenna 10, a GPS receiving section 20, a TCXO (temperature compensated crystal oscillator) 40, a host CPU (central processing unit) 50, an operating section 60, a display section 70, a mobile phone antenna 80, a radio communication circuit section 90 for mobile phone, a ROM (read only memory) 100, and a RAM (random access memory) 110.

The GPS antenna 10 is an antenna that receives an RF signal including a GPS satellite signal transmitted from the GPS satellite, and outputs the received signal to the GPS receiving section 20.

The GPS receiving section 20 is a positioning section that measures the current position of the mobile phone 1 on the basis of a signal output from the GPS antenna 10, and is a functional block equivalent to a so-called GPS receiver. The GPS receiving section 20 is configured to include an RF (radio frequency) receiving circuit section 21 and a baseband processing circuit section 30. In addition, the RF receiving circuit section 21 and the baseband processing circuit section 30 may be manufactured as separate LSIs (large scale integration) or may be manufactured as one chip.

The RF receiving circuit section 21 is a circuit block of a high-frequency signal (RF signal) and generates an oscillation signal for RF signal multiplication by dividing or multiplying an oscillation signal generated by the TCXO 40. Then, the RF signal is down-converted into a signal (hereinafter, referred to as an 'IF (intermediate frequency) signal') having an intermediate frequency by multiplying the RF signal output from the GPS antenna 10 by the generated oscillation signal, multiplication and the like of the IF signal are performed, and then the IF signal is converted into a digital signal by an A/D converter to be output to the baseband processing circuit section 30.

The baseband processing circuit section 30 is a circuit section that captures and extracts a GPS satellite signal by performing correlation processing and the like on the IF signal output from the RF receiving circuit section 21 and performs a positioning operation by decoding data to obtain a navigation message, time information, and the like. The baseband processing circuit section 30 is configured to include a satellite capture and tracking section 31, a CPU 33 as a processor, and a ROM 35 and a RAM 37 as memories. In addition, although it is explained in the present embodiment that the positioning operation of the current position is executed in the CPU 33, it is needless to say that all processing executed in the CPU 33 may be executed by the host CPU 50.

The satellite capture and tracking section 31 is a circuit section that captures and tracks a GPS satellite signal from the IF signal output from the RF receiving circuit section 21 and outputs information on a reception frequency or a code phase obtained by capture and tracking of a GPS satellite signal, as an actual measurement value, to the CPU 33.

The capture of a GPS satellite signal is realized by correlation processing in which a correlation value between an IF signal and a spread code (replica C/A code) generated in a pseudo manner is calculated and a frequency component and a phase component corresponding to a largest amplitude are extracted. In addition, the tracking of a GPS satellite signal is realized by tracking a code of a carrier and a C/A code included in the GPS satellite signal using a circuit, such as a code loop known as a delay locked loop (DLL) or a carrier loop known as a phase locked loop (PLL).

Figure 5:
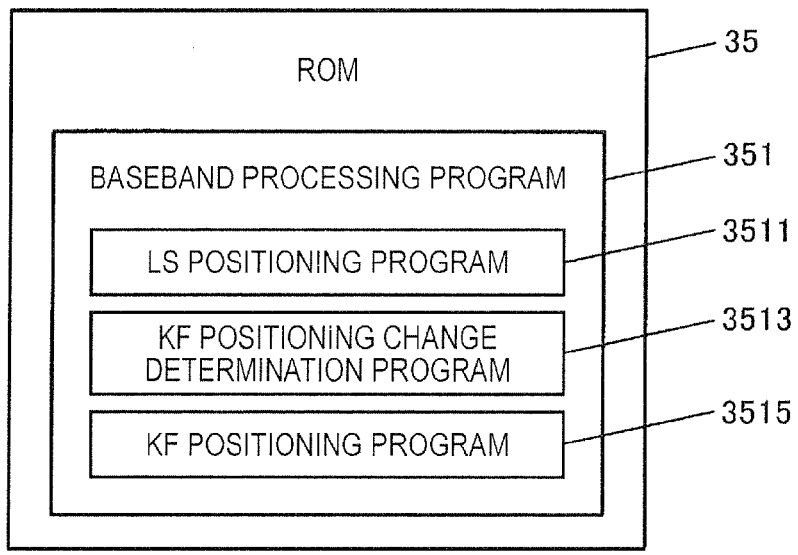
FIG. 5 is a view illustrating an example of data stored in a ROM.

FIG. 5 is a view illustrating an example of data stored in the ROM 35. A baseband processing program 351 that is read by the CPU 33 and is executed as baseband processing (refer to FIG. 9) is stored in the ROM 35. In addition, an LS positioning program 3511 executed as LS positioning processing, a KF positioning change determination program 3513 executed as KF positioning change determination processing (refer to FIG. 10), and a KF positioning program 3515 executed as the KF positioning processing (refer to FIGS. 1 to 3) are included as a subroutine in the baseband processing program 351.

The baseband processing is processing in which the CPU 33 measures and outputs the current position of the mobile phone 1 while switching the LS positioning processing and the KF positioning processing. Details of the baseband processing will be described later using a flow chart.

The LS positioning processing is processing in which the CPU 33 measures the current position of the mobile phone 1 by performing a positioning operation using the least square method for a plurality of captured satellites. Since the LS positioning processing is known, a detailed explanation will be omitted.

The KF positioning change determination processing is processing in which the CPU 33 determines whether or not the number of times of LS positioning processing consecutively executed has reached a predetermined number of times and, if it is determined that the number of times of LS positioning processing consecutively executed has reached the predetermined number of times, the CPU 33 determines that a change to the KF positioning processing is possible when a predetermined error equality condition is satisfied. Details of the KF positioning change determination processing will be described later using a flow chart.

The KF positioning processing is processing in which the CPU 33 measures the current position of the mobile phone 1 by performing a positioning operation using the Kalman filter for a plurality of captured satellites. The KF positioning processing was already explained with reference to FIGS. 1 to 3.

Figure 6:
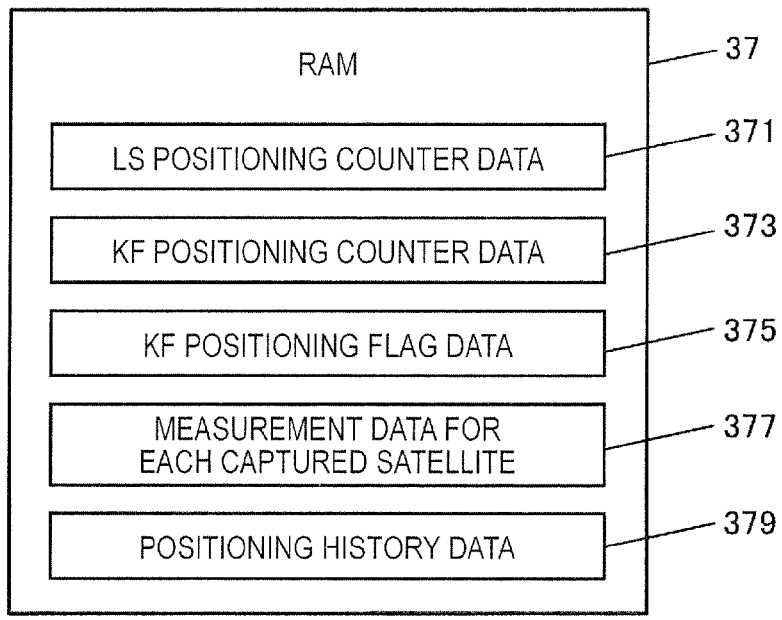
FIG. 6 is a view illustrating an example of data stored in a RAM.

FIG. 6 is a view illustrating an example of data stored in the RAM 37. LS positioning counter data 371, KF positioning counter data 373, KF positioning flag data 375, measurement data 377 for each captured satellite, and positioning history data 379 are stored in the RAM 37.

The LS positioning counter data 371 is data in which an LS positioning counter for counting the number of times of LS positioning processing consecutively executed is stored, and is updated in the baseband processing by the CPU 33. The KF positioning counter data 373 is data in which a KF positioning counter for counting the number of times of KF positioning processing consecutively executed is stored, and is updated in the baseband processing by the CPU 33.

The KF positioning flag data 375 is data in which a KF positioning flag, which is set to 'ON' when it is determined that a change from the LS positioning processing to the KF positioning processing is possible, is stored, and is updated in the baseband processing by the CPU 33.

Figure 7:
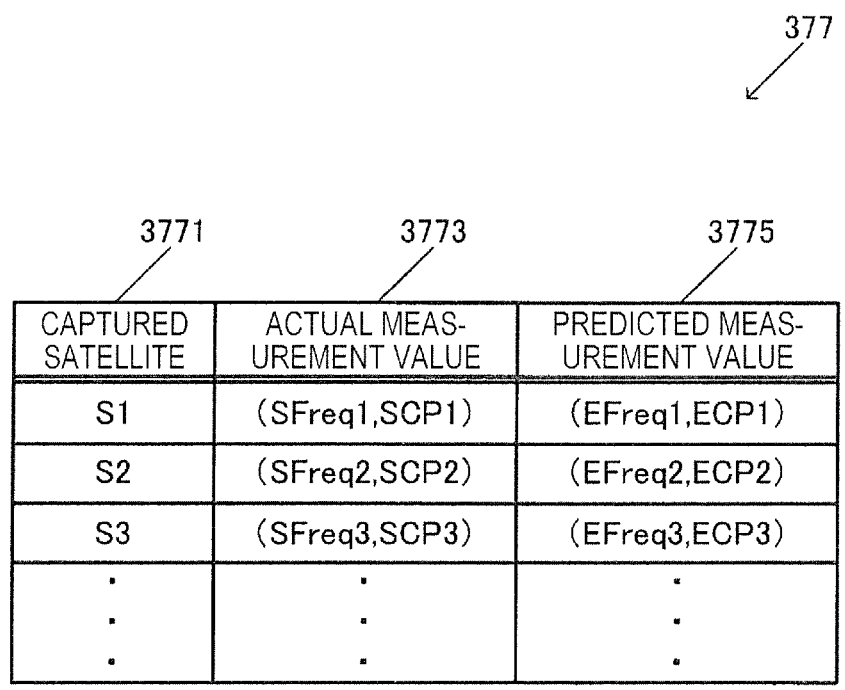
FIG. 7 is a view illustrating an example of the data configuration of measurement data for each captured satellite.

FIG. 7 is a view illustrating an example of the data configuration of the measurement data 377 for each captured satellite. A captured satellite 3771, an actual measurement value 3773, and a predicted measurement value 3775 are stored in the measurement data 377 for each captured satellite so as to match each other. The number of the captured satellite is stored in the captured satellite 3771. In addition, an actual measurement value and a predicted value of a reception frequency or code phase of the GPS satellite signal received from the captured satellite are stored in the actual measurement value 3773 and the predicted measurement value 3775, respectively.

For example, regarding a captured satellite 'S1', the reception frequency is 'SFreq1' and the code phase is 'SCP1' in the case of an actual measurement value, and the reception frequency is 'EFreq1' and the code phase is 'ECP1' in the case of a predicted measurement value. In the KF positioning processing, the CPU 33 performs velocity correction processing and position correction processing by using a difference between the actual measurement value and the predicted measurement value as the observed value 'Z'.

FIG. 8 is a view illustrating an example of the data configuration of the positioning history data 379. In the positioning history data 379, a time 3791 when the measured position is determined, its measured position 3793, and a σ value 3795 are stored in the new order so as to match each other. Among the positioning history data 379, a combination of the time 3791, the measured position 3793, and the σ value 3795 of latest one record is called 'latest positioning information' and a combination of the time 3791, the measured position 3793, and the σ value 3795 of second latest one record is called 'last positioning information'. In addition, the measured position 3793 included in the latest positioning information is called 'latest measured position'.

For example, at time 't1', the measured position is (X1,Y1, Z1) and regarding the σ value, a position σ value is 'Pσ1', a clock bias σ value is 'Bσ1', a velocity σ value is 'Vσ1', and a clock drift σ value is 'Dσ1'. The positioning history data 379 are updated in the LS positioning processing and the KF positioning processing by the CPU 33.

The TCXO 40 is a temperature compensated crystal oscillator which generates an oscillation signal at a predetermined oscillation frequency and outputs the generated oscillation signal to the RF receiving circuit section 21 and the baseband processing circuit section 30.

The host CPU 50 is a processor which makes an overall control of the sections of the mobile phone 1 according to various programs, such as a system program, stored in the ROM 100. The host CPU 50 displays, on the display section 70, a navigation screen on which the latest measured position input from the CPU 33 of the baseband processing circuit section 30 is plotted.

The operating section 60 is an input device configured to include a touch panel or a button switch, for example, and outputs a signal corresponding to a pressed key or button to the host CPU 50. By the operation of the operating section 60, various kinds of instruction input, such as a call request or a mail transmission or reception request, are performed.

The display section 70 is a display device which is formed by using an LCD (liquid crystal display), for example, and performs various kinds of display on the basis of a display signal input from the host CPU 50. A navigation screen, time information, and the like are displayed on the display section 70.

The mobile phone antenna 80 is an antenna used to perform transmission and reception of a radio signal for mobile phones between the mobile phone 1 and a base station provided by a communication service provider of the mobile phone 1.

The radio communication circuit section 90 for mobile phone is a communication circuit section of a mobile phone configured to include an RF conversion circuit, a baseband processing circuit, and the like and realizes transmission and reception of a call or mail by performing modulation, demodulation, and the like of the radio signal for mobile phones.

The ROM 100 stores a system program, which is used when the host CPU 50 controls the mobile phone 1, and various programs or data used to realize a navigation function, and the like.

The RAM 110 forms a work area in which the system program executed by the host CPU 50, various processing programs, data being processed in various kinds of processing, a processing result, and the like are temporarily stored.

3. Flow of Processing

Figure 9:
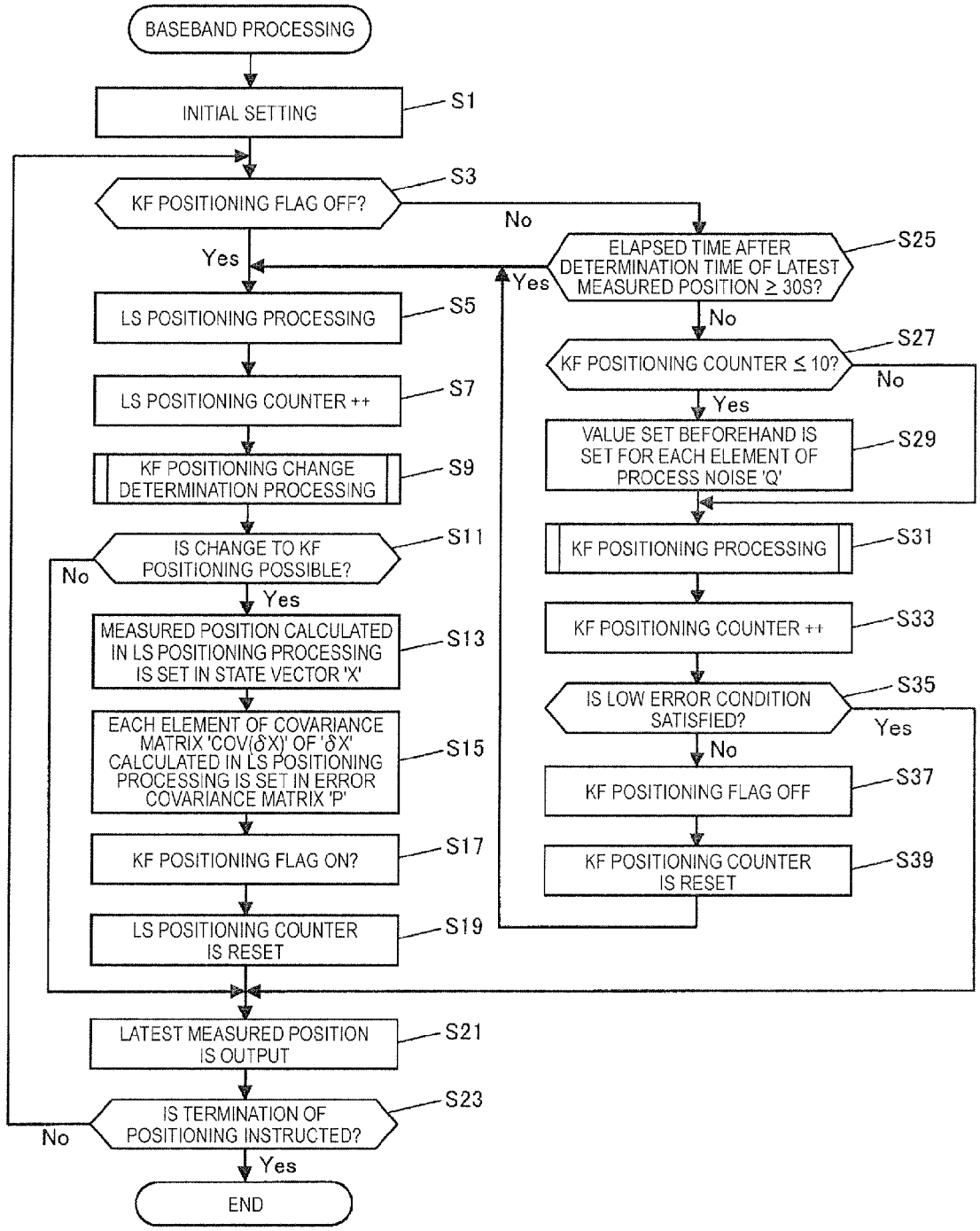
FIG. 9 is a flow chart illustrating the flow of baseband processing.

FIG. 9 is a flow chart illustrating the flow of baseband processing executed in the mobile phone 1 when the CPU 33 reads and executes the baseband processing program 351 stored in the ROM 35.

The baseband processing is processing executed when the RF receiving circuit section 21 receives a GPS satellite signal and the CPU 33 detects that an operation of instructing the start of positioning has been performed in the operating section 60, and is processing executed together with various kinds of processing called execution of various applications. In addition, execution of the processing may also be started when a power supply operation of the mobile phone 1 is detected in a condition where ON/OFF of a power supply of the mobile phone 1 and start/stop of a GPS are simultaneously performed. In principle, the positioning operation is assumed to be performed every '1 second'.

Furthermore, although not particularly described, it is assumed that being under execution of the baseband processing is a state where receiving of an RF signal using the GPS antenna 10, down-conversion to an IF signal using the RF receiving circuit section 21, and capture and tracking of a GPS satellite signal using the satellite capture and tracking section 31 are performed as needed.

First, the CPU 33 performs initial setting (step S1). Specifically, the LS positioning counter and the KF positioning counter are set to '0' to be then stored in the LS positioning counter data 371 and the KF positioning counter data 373 of the RAM 37, respectively. In addition, the KF positioning flag is set to 'OF' to be then stored in the KF positioning flag data 375 of the RAM 37.

Then, the CPU 33 determines whether or not the KF positioning flag stored in the KF positioning flag data 375 of the RAM 37 is 'OFF' (step S3). If it is determined that the KF positioning flag is 'OFF' (step S3; Yes), the CPU 33 performs LS positioning processing by reading and executing the LS positioning program 3511 stored in the ROM 35 (step S5)

In the LS positioning processing, the CPU 33 measures the current position of the mobile phone 1 by performing a positioning operation using the least square method for a plurality of captured satellites. In addition, according to the expressions (9) to (18), the position σ value, the clock bias σ value, the velocity σ value, and the clock drift σ value are calculated to be then stored in the positioning history data 379 of the RAM 37 so as to correspond to the time 3791, the measured position 3793, and the σ value 3795.

Then, the CPU 33 increments the LS positioning counter stored in the LS positioning counter data 371 of the RAM 37 (step S7). Then, the CPU 33 performs the KF positioning change determination processing by reading and executing the KF positioning change determination program 3513 stored in the ROM 35 (step S9).

Figure 10:
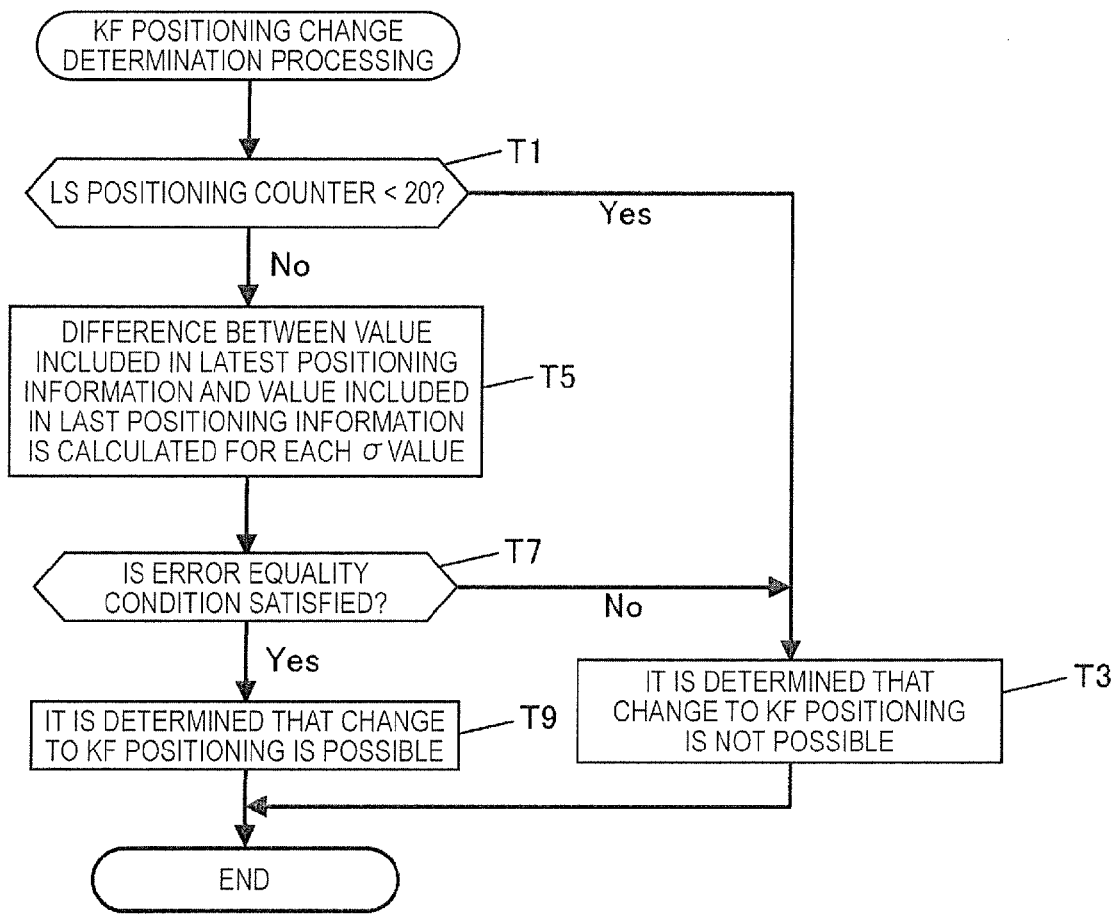
FIG. 10 is a flow chart illustrating the flow of KF positioning change determination processing.

FIG. 10 is a flow chart illustrating the flow of KF positioning change determination processing.

First, the CPU 33 determines whether or not the LS positioning counter stored in the LS positioning counter data 371 of the RAM 37 is less than '20' (step T1). If it is determined that the LS positioning counter is less than '20' (step T1; Yes), the CPU 33 determines that a change to the KF positioning is not possible (step T3), completing the KF positioning change determination processing.

On the other hand, if it is determined that the LS positioning counter is equal to or larger than '20' (step T1; No), the CPU 33 calculates a difference between a value included in the latest positioning information and a value included in the last positioning information for each σ value 3795 stored in the positioning history data 379 of the RAM 37 (step T5).

Then, the CPU 33 determines whether or not the error equality condition is satisfied (step T7). Specifically, the CPU 33 determines whether or not a difference of each σ value calculated in step T5 is less than a threshold value set beforehand for each σ value and then determines that the error equality condition is satisfied if differences of all σ values are less than the threshold values. On the other hand, if at least σ value equal to or larger than the threshold value exists, the CPU 33 determines that the error equality condition is not satisfied.

If it is determined that the error equality condition is not satisfied in step T7 (step T7; No), the CPU 33 moves the processing to step T3. On the other hand, if it is determined that the error equality condition is satisfied (step T7; Yes), the CPU 33 determines that a change to the KF positioning is possible since the positioning change condition is satisfied (step T9), completing the KF positioning change determination processing.

Returning to the baseband processing of FIG. 9, the CPU 33 performs the KF positioning change determination processing and then moves the processing to step S21 if the change to the KF positioning is not possible (step S11; No). In addition, if the change to the KF positioning is possible (step S11; Yes), the CPU 33 sets the measured position calculated in the LS positioning processing as a position element of the state vector 'X' of the Kalman filter (step S13).

In addition, the CPU 33 sets each element of the covariance matrix 'cov(δX)' of 'δX' calculated according to the expressions (13) and (16) to correspond to each element of the error covariance matrix 'P' of the Kalman filter (step S15). Thus, an initial value of the error covariance matrix 'P' suitable for the actual environment is set. As a result, the positioning accuracy of the KF positioning processing is improved.

Then, the CPU 33 sets the KF positioning flag, which is stored in the KF positioning flag data 375 of the RAM 37, to 'ON' (step S17). In addition, the CPU 33 resets the LS positioning counter stored in the LS positioning counter data 371 of the RAM 37 (step S19).

Then, the CPU 33 outputs the latest measured position, which is stored in the positioning history data 379 of the RAM 37, to the host CPU 50 (step S21). Then, the CPU 33 determines whether or not the user has instructed termination of positioning using the operating section 60 (step S23). If it is determined that the termination of positioning is not instructed (step S23; No), the process returns to step S3. In addition, if it is determined that the termination of positioning has been instructed (step S23; Yes), the baseband processing is completed.

On the other hand, if it is determined that the KF positioning flag is 'ON' in step S3 (step S3; No), the CPU 33 determines whether or not an elapsed time from the determination time of the latest measured position stored in the positioning history data 379 of the RAM 37 is equal to or larger than '30 seconds' (step S25).

Then, if it is determined that the elapsed time is equal to or larger than '30 seconds' (step S25; Yes), the CPU 33 moves the processing to step S5. If a GPS satellite signal cannot be received from a GPS satellite and the KF positioning processing cannot be executed for a long time, for example, in a case where the mobile phone 1 is located in a tunnel, the measured position obtained last deviates largely from the true position of the mobile phone 1. As a result, there is a possibility that the current position will not be predicted correctly. Accordingly, when a predetermined time elapses from the determination time of the latest measured position, the KF positioning processing stops to proceed to the LS positioning processing.

On the other hand, if it is determined that the elapsed time is less than '30 seconds' in step S25 (step S25; No), the CPU 33 determines whether or not the KF positioning counter stored in the KF positioning counter data 373 of the RAM 37 is equal to or smaller than '10' (step S27).

Then, if it is determined that the KF positioning counter is larger than '10' (step S27; No), the CPU 33 moves the processing to step S31. If it is determined that the KF positioning counter is equal to or smaller than '10' (step S27; Yes), the CPU 33 sets a preset value as each element of a process noise 'Q' which is a parameter of the Kalman filter (step S29).

In the present embodiment, the measured position calculated in the LS positioning processing is set as the initial position of the KF positioning processing (step S13). However, there is a possibility that the measured position calculated in the LS positioning processing will be far from the true position of the mobile phone 1.

Therefore, regarding a predetermined number of times after change to the KF positioning processing, a large value (for example, '5.65 m' as a specific number) is set as each element of a 3×3 matrix portion, which corresponds to the three-dimensional position vector (x, y, z), among the process noise 'Q' expressed by the 8×8 matrix and '0' is set as other elements in order that the measured position becomes easily close to the true position by increasing a variation in the measured position according to a time change.

After setting the process noise 'Q' in step S29, the CPU 33 performs the KF positioning processing by reading and executing the KF positioning program 3515 stored in the ROM 35 (step S31). In the KF positioning processing, the CPU 33 executes processing according to the flow chart of FIGS. 1 to 3.

Then, the CPU 33 increments the KF positioning counter stored in the KF positioning counter data 373 of the RAM 37 (step S33). Then, the CPU 33 determines whether or not a low error condition is satisfied (step T35). Specifically, the CPU 33 determines whether or not each element of a 3×3 matrix portion, which corresponds to the three-dimensional position vector (x, y, z), of the error covariance matrix 'P' calculated by the KF positioning processing is less than a predetermined threshold value. If it is determined that each element of the 3×3 matrix portion is less than the predetermined threshold value, the CPU 33 determines that the low error condition is satisfied.

Then, if it is determined that the low error condition is satisfied (step S35; Yes), the CPU 33 moves the processing to step S21. If it is determined that the low error condition is not satisfied (step S35; No), the CPU 33 sets the KF positioning flag, which is stored in the KF positioning flag data 375 of the RAM 37, to 'OFF' (step S37). Then, the CPU 33 resets the KF positioning counter stored in the KF positioning counter data 373 of the RAM 37 (step S39) and then moves the processing to step S5.

4. Operations and Effects

According to the present embodiment, the current position is measured by receiving GPS satellite signals transmitted from a plurality of GPS satellites and then performing the LS positioning processing using the least square method. Then, it is determined whether or not a result of the LS positioning processing satisfies a positioning change condition set beforehand as a condition for change of positioning processing. If it is determined that the result of the LS positioning processing satisfies the positioning change condition, the LS positioning processing is stopped and GPS satellite signals transmitted from a plurality of GPS satellites are received and then KF positioning processing using a Kalman filter is performed, thereby measuring the current position.

When the number of times of consecutive measurements of the current position in the LS positioning processing reaches a predetermined number of times (for example, '20 times') and a σ value calculated this time and a σ value calculated last time in the LS positioning processing satisfy the error equality condition, it is determined that a change to the KF positioning processing is possible since the positioning change condition is satisfied. Accordingly, since a measured position with low reliability is not used in the KF positioning processing, it is prevented that the positioning accuracy lowers.

Furthermore, in a case where it is determined that the error covariance matrix 'P' calculated in the KF positioning processing does not satisfy a predetermined low error condition or a case where it is determined that the elapsed time after the KF positioning processing is finally performed has reached a predetermined time, the KF positioning processing is stopped to change to the LS positioning processing. Therefore, for example, in a case where the measured position with low accuracy is obtained in the KF positioning processing or a case where the KF positioning processing cannot be performed for a predetermined period of time since the mobile phone 1 is located in a tunnel, a change to the LS positioning processing is performed.

5. Modifications 5-1. Electronic Apparatus

The invention may be applied to any kind of electronic apparatus as long as the electronic apparatus includes a positioning device. For example, the invention may also be applied similarly to a notebook computer, a PDA (personal digital assistant), a car navigation apparatus, and the like.

5-2. Satellite Positioning System

In the above embodiment, an explanation has been made using a GPS as an example of a satellite positioning system. However, other satellite positioning systems, such as a WAAS (wide area augmentation system), a QZSS (quasi zenith satellite system), a GLONASS (global navigation satellite system), and a GALILEO, may also be used.

5-3. Division of Processing

It is possible to make the host CPU 50 execute some or all of processing executed by the CPU 33. For example, the host CPU 50 is made to execute the KF positioning change determination processing, and the CPU 33 is made to switch the positioning processing on the basis of the determination result. Alternatively, the host CPU 50 may be made to execute all processing including LS positioning processing and KF positioning processing executed by the CPU 33.

5-4. Positioning Change Condition

In the above embodiment, a case in which the change to the KF positioning processing is determined to be possible when the number of times of consecutive measurements of the current position in the LS positioning processing reaches a predetermined number of times (for example, '20 times') and a σ value calculated this time and a σ value calculated last time in the LS positioning processing satisfy the error equality condition has been described. However, it may be determined that the change to the KF positioning processing is possible when one of the conditions is satisfied.

5-5. Setting of a Measurement Error Matrix 'R'

In the above-described embodiment, after switching from the LS positioning processing to the KF positioning processing, a large value is set as a position element of the process noise 'Q' regarding the predetermined number of times, such that the measured position becomes easily close to the true position by increasing the variation in the measured position according to a time change. This may also be realized by setting a small value as a position element of the measurement error matrix 'R' which is another parameter of the Kalman filter.

Japanese Patent Application No. 2007-267485 filed on Oct. 15, 2007, is hereby incorporated by reference in its entirety.

What is claimed is:

1. A positioning method in a positioning device, comprising:
   receiving positioning signals transmitted from a plurality of positioning satellites;
   measuring a first current position by performing first positioning processing using a least square method and the received positioning signal;
   determining whether or not a result of the first positioning processing satisfies a positioning change condition set beforehand as a condition for change of positioning processing;
   stopping the first positioning processing when it is determined that the result of the first positioning processing satisfies the positing change condition; and measuring a second the current position by performing second positioning processing using a Kalman filter, the received positioning signals and the result of the first positioning processing after the stopping the first positioning processing.

2. The positioning method according to claim 1, wherein in the determination on whether or not the positioning change condition is satisfied, it is determined that the positioning change condition is satisfied when the number of times of consecutive measurements of the current position in the first positioning processing reaches a predetermined number of times of positioning change.

3. The positioning method according to claim 1, wherein the first positioning processing is processing for calculating errors of positional information and velocity information on the positioning device in addition to measuring the current position, and in the determination on whether or not the positioning change condition is satisfied, it is determined that the positioning change condition is satisfied when an error calculated this time and an error calculated last time in the first positioning processing satisfy a predetermined error equality condition.

4. The positioning method according to claim 3, wherein the second positioning processing is processing for calculating a covariance of the errors of the positional information and velocity information on the positioning device in addition to measuring the current position, and setting an initial value of the covariance of the errors on the basis of the errors calculated in the first positioning processing is further included.

5. The positioning method according to claim 4, further comprising:

determining whether or not the covariance of the errors calculated in the second positioning processing satisfies a predetermined low error condition; and stopping the second positioning processing and performing the first positioning processing when it is determined that the low error condition is not satisfied.

6. The positioning method according to claim 1, further comprising:

determining whether or not an elapsed time after the second positioning processing is performed last has reached a predetermined positioning change time; and stopping the second positioning processing and performing the first positioning processing when it is determined that the elapsed time has reached the positioning change time.

7. The positioning method according to claim 1, further comprising:

performing the second positioning processing by changing a filter characteristic of the Kalman filter such that a variation in measured position according to a time change becomes large until a predetermined stability condition is satisfied after the positioning processing has changed from the first positioning processing to the second positioning processing.

8. A program causing a computer provided in a positioning device to execute the positioning method according to claim 1.

9. A positioning device comprising:

an RF receiving circuit section that receives positioning signals transmitted from a plurality of position satellites;

a first positioning processing section that measures a first current position by performing first positioning processing using a least square method and the received positioning signal;

a positioning change condition determining section that determines whether or not a result of the first positioning processing satisfies a positioning change condition set beforehand as a condition for change of positioning processing, the first positioning processing section stopping the first positioning processing when it is determined that the result of the first positioning processing satisfies the positioning change condition; and a second positioning processing section that measures a second current position by performing second positioning processing using a Kalman filter, the received positioning signals and the result of the first positioning processing after the stopping the first positioning processing.

10. The positioning device according to claim 9, wherein in the determination on whether or not the positioning change condition is satisfied, the positioning change condition determining section determines that the positioning change condition is satisfied when the number of times of consecutive measurements of the current position in the first positioning processing reaches a predetermined number of times of positioning change.

11. The positioning device according to claim 9, wherein the first positioning processing section calculates errors of positional information and velocity information in addition to measuring the current position in the first positioning processing, and in the determination on whether or not the positioning change condition is satisfied, the positioning change condition determining section determines that the positioning change condition is satisfied when an error calculated this time and an error calculated last time in the first positioning processing satisfy a predetermined error equality condition.

12. The positioning device according to claim 11, wherein the second positioning processing section calculates a covariance of the errors of the positional information and the velocity information in addition to measuring the current position in the second positioning processing, and an error covariance initial value setting section that sets an initial value of the covariance of the errors on the basis of the errors calculated in the first positioning processing is further included.

13. The positioning device according to claim 12, further comprising:

a low error condition determining section that determines whether or not the covariance of the errors calculated in the second positioning processing satisfies a predetermined low error condition, wherein the first positioning processing section stops the second positioning processing and performs the first positioning processing when it is determined that the low error condition is not satisfied.

14. The positioning device according to claim 9, further comprising:

a positioning change time determining section that determines whether or not an elapsed time after the second positioning processing is performed last has reached a predetermined positioning change time, wherein the first positioning processing section stops the second positioning processing and performs the first positioning processing when it is determined that the elapsed time has reached the positioning change time.

15. An electronic apparatus comprising the positioning device according to claim 9.

* * * * *